United States Patent [19]

Moriya et al.

[11] Patent Number: 5,257,250
[45] Date of Patent: Oct. 26, 1993

[54] TRACKING-CONTROL TARGET-POSITION ADJUSTMENT METHOD

[75] Inventors: Mitsuro Moriya, Neyagawa; Masayuki Shibano, Izumisano; Hiroyuki Yamaguchi; Shinichi Yamada, both of Hirakata; Katsuya Watanabe, Osaka, all of Japan

[73] Assignee: Matsushita Electric Industrial Co., Ltd., Osaka, Japan

[21] Appl. No.: 450,992

[22] Filed: Dec. 15, 1989

[30] Foreign Application Priority Data

Dec. 16, 1988 [JP] Japan .................. 63-319031
Dec. 21, 1988 [JP] Japan .................. 63-322618

[51] Int. Cl.⁵ .................. G11B 7/09; G11B 7/007
[52] U.S. Cl. .................. 369/44.25; 369/44.26; 369/44.34; 369/44.41; 369/32; 369/275.3
[58] Field of Search .................. 369/275.3, 275.4, 44.25, 369/44.26, 44.32, 47, 44.34, 44.35, 46.41, 32, 33, 100, 44.28; 360/77.05, 77.06, 77.07, 77.08, 77.11

[56] References Cited
U.S. PATENT DOCUMENTS 4,879,705 11/1989 Aoyagi et al. .................. 369/33
4,893,298 1/1990 Pasnan et al. .................. 369/275.4
4,974,221 11/1990 Hosoya et al. .................. 369/44.35

FOREIGN PATENT DOCUMENTS 57-50330  3/1982  Japan .
0151843   7/1986  Japan .................. 369/275.4
0296443  11/1989  Japan .................. 369/275.4

Primary Examiner—Aristotelis Psitos
Assistant Examiner—Mohammad Edun
Attorney, Agent, or Firm—Wenderoth, Lind & Ponack

[57] ABSTRACT

A tracking control target position adjusting track is provided on a recording carrier, where the track contains a preliminarily recorded first position-adjusting signal adjoining one side of track and a second position-adjusting signal adjoining the other side of track. While the reproduction position set on the target-position adjusting track, the tracking control apparatus adjusts the tracking-control target position based on reproduced first and second position-adjusting signals. As a result, the tracking control apparatus can precisely adjust the tracking control target position, thus providing quite satisfactory interchangeability with the corresponding apparatuses.

16 Claims, 8 Drawing Sheets

TRACKING-CONTROL TARGET-POSITION ADJUSTMENT METHOD

Background of the Invention

1) Field of the Invention

The present invention relates to a tracking control method applicable to a signal recording and reproduction system using a recording carrier incorporating a track containing recorded signals or a track available for recording data signals by driving a transfer means in response to a signal from a track-deviation detection means so the data recording or reproducing position can correctly be set on the track. More particularly, the invention relates to a method of adjusting the tracking-control target position as well as related apparatus and a recording carrier designed for embodying the invention.

2) Description of the Prior Art

Typically, there is a conventional optical-disc recording and reproducing apparatus which utilizes a rewritable recording carrier such as a phase-change optical disc or a magneto-optical disc, and has a tracking control means for maintaining a focused light beam on the recording carrier in a position such that the light spot impinges at the center of an information track during recording and reproduction. This prior art is disclosed in Japanese Laid-Open Patent Publication No. 57-50330 of 1982 for example.

Conventionally, a track in the form of concave and convex structure are provided on the recording carrier which has a recording medium layer formed thereon. A photosensor having a double sensing means receives a light beam reflected from or permeating through the recording carrier. The difference in the amount of light detected by the double-eyed photosensor becomes the signal representing the positional deviation between the light beam and track on the recording carrier. Concretely, the photocurrent detected by the double-eyed photosensor is converted into two voltages and then the difference in the voltages is calculated by a differential amplifier so that the track deviation signal can be generated. After being processed by the tracking control circuit, the track deviation signal is added to the tracking actuator which directs the light beam on the recording carrier in the direction of the width of track so that the light beam impinging on the recording carrier can be positioned on the track. The tracking control target is substantially the position on the track at which the output from the differential amplifier generating the track deviation signal reaches a predetermined volume amount, i. e., the position on the track at which the light amount received by each half of the double-eyed photosensor becomes equal. The light beam on the recording carrier is properly controlled so that it can always be positioned at the target position.

It is very important for the optical disc recording and/or reproduction apparatus mentioned above to maintain interchangeability between the corresponding apparatuses for exchanging the recording carriers. Concretely, it is quite essential for the optical-disc recording/reproduction apparatus to reproduce a signal recorded by other corresponding apparatuses with satisfactory reliability and correctly and fully erase those remaining signals recorded by other apparatuses before recording new signals. To achieve satisfactory interchangeability, it is quite essential for all the optical disc recording/reproduction apparatuses to maintain a focused light beam on the recording carrier in a position such that the light spot can correctly impinge at the reference position of the track such as tne center of the track, for example. To achieve this, all of the optical-disc recording/reproduction apparatuses should have the identical target position for the tracking control system.

As mentioned earlier, the tracking control system operates so that the output from the differential amplifier generating a track-deviation signal can reach a predetermined value. However, the target position of the tracking control system differs among different optical-disc recording/reproduction systems. Such a difference is caused by the difference in the sensitivity of the double-eyed photosensor, a difference in the conversion rate of the current-to-voltage (I/V) used for converting photocurrents into voltages, or the difference in the gains of the differential amplifiers which respectively generate the track-deviation signals.

Furthermore, depending on the optical-disc recording/reproduction apparatus, there is a certain difference in the performance of the optical system when directing the light beam reflected from or permeating through the recording carrier to the double-eyed photosensor. This in turn varies the condition of the light beam on the double-eyed photosensor. If this occurs, the target position needed for controlling the tracking operation is also variable, thus lowering the interchangeability.

As mentioned above, since all the conventional optical-disc recording/reproduction apparatuses have not yet been provided with a means for correctly adjusting the target position of the tracking control system, the target position varies in each apparatus, and as a result, interchangeability between each optical-disc recording and reproduction apparatus still remains unsatisfactory.

SUMMARY OF THE INVENTION

An object of the invention is to fully eliminate those defects cited above by proposing a novel method of performing an adjustment so that the tracking-control target position can perfectly match a predetermined target position and a novel recording carrier ideally suited to the proposed method and by providing an extremely reliable tracking control apparatus securing perfect interchangeability.

To achieve the above object, a recording carrier embodied by the invention is preliminarily provided with a tracking-control target-position adjusting track which is adjoined at one side thereof by a track having recorded thereon a first adjusting signal and at the other side by a track having recorded thereon a second adjusting signal.

The tracking-control target-position adjustment method embodied by the present invention correctly adjusts the tracking-control target position based on the first and second adjusting signals reproduced by a reproduction means while the tracking control system operates so that the reproduction position of the reproduction means can be correctly positioned on the target-position adjusting track.

Based on the structure mentioned above, the system embodied by the invention correctly adjusts the tracking-control target position by effectively applying the tracking-control target-position adjusting signal which is preliminarily recorded on the recording carrier. As a result, the tracking-control target position can correctly be adjusted to the predetermined position, thus significantly promoting the interchangeability between the optical-disc recording and reproduction apparatuses.

DESCRIPTION OF THE PREFERRED EMBODIMENTS

Figure 1:
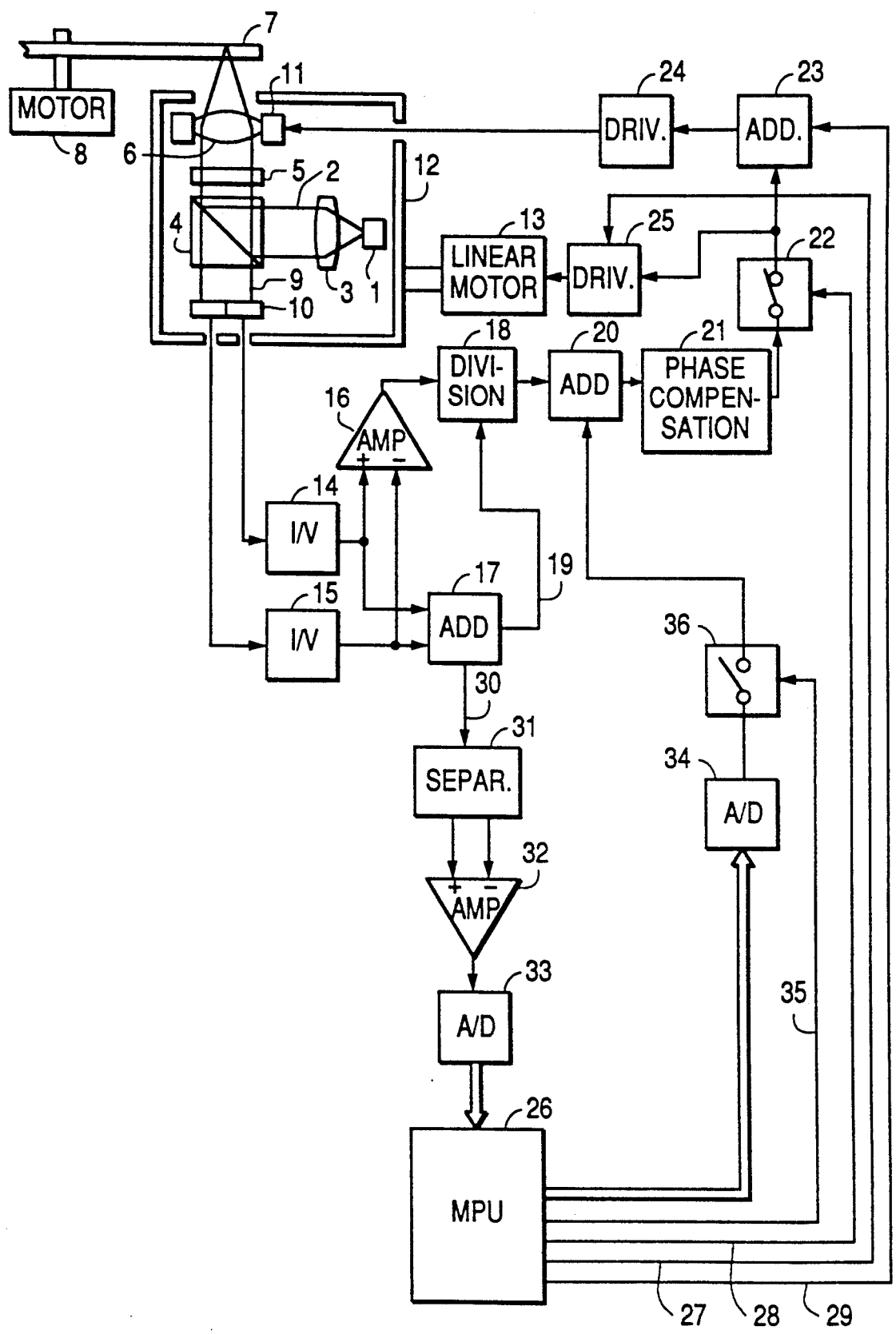
FIG. 1 illustrates a schematic block diagram showing an embodiment of a tracking-control target-position adjustment apparatus according to the present invention.

Referring now more particularly to the accompanying drawings, preferred embodiments of the invention are described below. The identical components shown in the drawings are designated by the identical reference numerals.

FIG. 1 illustrates the schematic block diagram of an embodiment of the tracking-control target-position adjusting apparatus suited for use with an optical-disc recording and reproduction apparatus. A light beam 2 generated by a light source 1, such as a semiconductor laser, for example, is converted into parallel beams by means of a coupling lens 3 and is reflected by a polarized beam splitter 4, and then directed to a lens 6 via a quarter-wave plate 5. The focused light beam 2 is then radiated against the data carrier surface of the disc-shape recording carrier 7. The recording carrier 7 incorporating a grooved-track is set to the rotary shaft of motor 8 and rotated at a predetermined speed of rotation. The light 9 of the light beam 2 reflected by the recording carrier 7 permeates the lens 6, quarter-wave plate 5, and the polarized beam splitter 4 before being radiated against the double-eyed photosensor 10. The lens 6 is mounted on a movable portion of the tracking actuator 11 which moves the lens 6 in the radial direction of the recording carrier 7, in other words, in the direction of the width of tracks on the recording carrier 7. The light source 1, coupling lens 3, polarized beam splitter 4, quarter-wave plate 5, photosensor 10, and the tracking actuator 11, are respectively mounted on a movable base 12 so that these component can integrally move together in the radial direction of the recording carrier 7 by means of a linear motor 13.

The photocurrent outputs from the photosensor 10 are converted into voltages by the current-to-voltage (I/V) converters 14 and 15 before being delivered to the differential amplifier 16 and the addition circuit 17. The differential amplifier 16 outputs a signal corresponding to the difference between the voltage signals output from the I/V converters 14 and 15. The line dividing the photosensor 10 into two parts is directed in the track direction on the light receiving surface of the photosensor 10. The differential amplifier 16 outputs a signal corresponding to the deviation of the position between the light beam 2 and the track on the recording carrier 7, i. e., the track deviation signal.

The signals output from the differential amplifier 16 and the addition circuit 17 via line 19 are delivered to a division circuit 18. The division circuit 18 outputs a signal corresponding to the value which is the result of dividing the signal from the differential amplifier 16 by the signal output from the addition circuit 17.

The signal output from the addition circuit 17 via line 19 is a sum of the signals delivered from the I/V converters 14 and 15, which have had their high-frequency components above 50K Hz removed from the output signal by means of a low-pass filter. As a result of the elimination of high-frequency components, external disturbance caused by a noise or damage component on the recording carrier or the track-address signal recorded on the track in the form of concave portions and convex are also eliminated to allow the tracking operation to be controlled more stably.

The signal output from the division circuit 18 is delivered to the tracking actuator 11 via an addition circuit 20, a phase which compensates circuit 21 compensating for the phase of the tracking control loop, switch 22 which inactivates the tracking control operation, an addition circuit 23, and a driving circuit 24 which amplifies the power. The signal output from the switch 22 is delivered to the linear motor 13 via a driving circuit 25 which amplifies the power. Accordingly, when the switch 22 is shortcircuited, the tracking actuator 11 and the linear motor 13 are activated in response to the signal from the differential amplifier 16 so that the light beam 2 on the recording carrier 7 can be positioned on the tracks.

Next, the functional operation of the division circuit 18 is described below. The signal output from the differential amplifier 16 in dealing with unit-wise track deviation, in other words, the track-deviation detection sensitivity, is variable in accordance with the strength of the light beam 2 generated by the light source 1, the reflection rate of the recording carrier, the sensitivity of the photosensor 10, or the photoconductivity of the optical system. If the sensitivity in the detection of the track deviation varies in the absence of the division circuit 18 the gain of the tracking control system also varies. This results in the unstable tracking control effect, or in some cases, oscillation may be generated to totally inhibit the tracking control operation. On the other hand, according to the embodiment of the present invention, even if the track-deviation detection sensitivity varies by N-times under those reasons mentioned above, since the magnitude of the signal output from the addition circuit 17 via line 19 is also multiplied by N-times, the signal output from the division circuit 18 in dealing with unit-wise track deviation remains stable, and yet, since the gain of the tracking control system does not vary itself, the tracking operation can be controlled very stably.

Next, the method of detecting the desired track is described below. The address signal is preliminarily recorded on the track of the recording carrier 7 in a concave and convex form. The desired track is detected by referring to the address signal. Using the signal from the address circuit 17, the address-reading circuit (not shown) reads addresses.

The microcomputer MPU 26 identifies the address of the track of the recording carrier 7 at which the light beam 2 is positioned by referring to the address read by the address-reading circuit, and then computes the difference between the current track address and that of the desired track. If the difference were in excess of the predetermined value, then, the MPU 26 roughly detects the address. Concretely, the MPU 26 outputs a signal corresponding to the difference between the addresses to the driving circuit 25 via line 27, and simultaneously, the MPU outputs the signal for releasing the switch 22 via line 28 to inactivate the tracking control. Then, the linear motor 13 drives the movable base 12 in the radial direction of the recording carrier 7. When the light beam 2 is directed to the position close to the desired track, the MPU 26 stops transmission of signals via line 27, and then activates the tracking control operation by short-circuiting the switch 22 before eventually reading the address of the track at which the light beam 2 on the recording carrier 7 is positioned. If this track were other than the desired one, the MPU 26 again computes the difference between the addresses of the current track and the desired track. Furthermore, if the computed value were less than the predetermined value, the MPU 26 closely detects the desired track by repeatedly executing jump-scans by the rounds corresponding to the difference of addresses. When scanning each track by jumping, the MPU 26 releases the switch 22, and simultaneously outputs a signal via line 29 to drive the tracking actuator. As a result, the light beam 2 on the recording carrier 7 is directed to the adjoining track before the MPU 26 again shortcircuits the switch 22.

Next, the method of executing the tracking-control target-position adjustment is described below. The addition circuit 17 sum up signals output from the current-to-voltage (I/V) converters 14 and 15, and then causes the high-pass filter to eliminate low-frequency components such as those below 10K Hz from the addup signal, and finally transmits the low-frequency-freed signal to the separation circuit 31 via line 30.

A target position adjusting track is provided for a position on the external or internal circumference (normally being held unused) of the recording carrier 7. The target position adjusting track has preliminarily recorded at a position adjoining one side thereof a first adjusting signal and at a position adjoining the other side thereof a second adjusting signal. The first and second adjusting signals are respectively composed of the single frequency signals F1 and F2. For example, the frequency of the first adjusting signal is 1.0M Hz and the frequency of the second adjusting signal is 1.5M Hz. These signals are preliminarily recorded in a concave and convex form.

If the track on the recording carrier 7 were of a concentric circular shape, one track means one concentric circular track. If the track on the recording carrier 7 were of a spiral shape, one track means one circumferential track in which circle starts from the point A on the track and ends at the point B intersecting the straight line connecting the point A to the center of the recording carrier 7 after fully turning around the recording carrier 7.

When adjusting the target position, first, the MPU 26 detects the target-position adjusting track and then activates the tracking control system so that the light beam 2 on the recording carrier 7 can be positioned on the target position adjusting track. If the track on the recording carrier 7 were of the spiral shape, the position of light beam 2 is brought back by one track every full turn of the recording carrier 7 to control the light beam 2 so that the light beam 2 can remain still on the identical circumference.

The target position is adjusted by causing the MPU 26 to detect frequency signals F1 and F2 (which intermingle with each other when a crosstalk component is generated) in the condition in which the light beam 2 on the recording carrier 7 is controllably positioned on the target-position adjusting track.

The separation circuit 31 separates frequency signals F1 and F2 from the signal delivered to the addition circuit 17 via line 30 and then detects the enveloped signal before transmitting the detected signal to a differential amplifier 32. The differential amplifier 32 outputs a signal corresponding to the difference of the received signals to an analog-to-digital (A/D) converter 33 which converts the analog signal from the differential amplifier 32 into a digital signal for delivery to the MPU 26. The MPU 26 detects the direction of the deviated tracking control target position by referring to the value delivered from the A/D converter 33. To shift the deviated target position in the desired direction, the MPU 26 outputs a signal to the digital-to-analog (D/A) converter 34 and another signal to switch 36 via line 35 to shortcircuit the switch 36.

The signal output from the D/A converter 34 is transmitted to the addition circuit 20 via a switch 36. After summing up signals from the division circuit 18 and the switch 36, the addition circuit 20 delivers the sum signal to the phase-compensation circuit 21. As a result, the tracking-control target position is variable in accordance with the signal from the D/A converter 34. While checking the signal output from the A/D converter 33 to allow the target position to gradually approach the desired spot, the MPU 26 outputs the gradually incremental signal to the D/A converter 34 so that the value output from the A/D converter 33 can arrive at the predetermined range.

Figure 2:
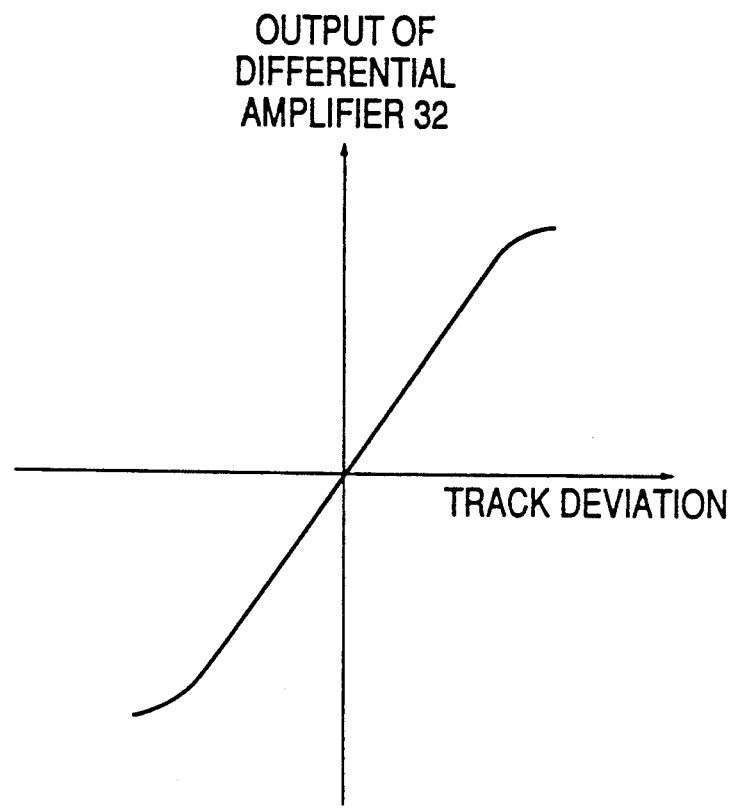
FIG. 2 illustrates a deviation relationship between the tracking movement and the signal output from the differential amplifier 32.

FIG. 2 illustrates the signal output from the differential amplifier 32 in correspondence with the deviation of the target position, where the horizontal axis designates the deviation of the target position and the vertical axis designates the signal output from the differential amplifier 32. As is clear from the chart shown in FIG. 2, if deviation occurs from the actual target position in one direction, the signal output from the differential amplifier 32 increases in the positive direction, whereas if the deviation occurs in the opposite direction, the absolute value of the signal output the differential amplifier 32 increases in the negative direction. Assume that X designates the deviation of the target position and Y designates the signal output from the differential amplifier 32, then, the relationship expressed by the following equation is almost fully satisfied.

$$Y = K1 * SIN(2\pi X/P)$$

Where K1 designates a constant, $\pi$ is the circular constant, and P is the track pitch, respectively.

According to the embodiment of the present invention, as mentioned earlier, the signal output from the division circuit 18 against the unit-wise tracking deviation is almost constant, and yet, the relationship between the value of the signal output from the A/D converter 33 and the amount of deviation from the target position also remains almost constant. Concretely, the MPU 26 can easily measure the amount of deviation from the target position corresponding to the value output from the A/D converter 33. For example, the MPU 26 can easily measure the deviation amount by reading out the data from the memory circuit having stored therein the table of the data to be delivered to the D/A converter 34 in correspondence with the value output by the A/D converter 33. Next, the MPU 26 outputs the value D0 corresponding to the value output by the A/D converter 33 to the D/A converter 34 to shift the tracking control target position. The MPU 26 again measures the value output by the A/D converter 33. If this value is out of the predetermined-value range, then, the MPU 26 reads out from the memory the data D1 (to be delivered to the D/A converter 34) corresponding to the value output by the A/D converter 33, and then, outputs the value (D0+D1) to the D/A converter 34. The MPU 26 repeatedly executed these sequential processes until the value output by the A/D converter 33 eventually enters into the predetermined range. By sequentially executing these processes, the MPU 26 can save the repeating rounds and quickly set the target position. After repeatedly executing the predetermined rounds of the target-position setting process, if the value output by the A/D converter 33 were still out of the predetermined range, then the MPU 26 identifies this situation to be abnormal, and then generates an abnormal signal at least before stopping the recording process. In this way, an abnormal condition of the apparatus can easily be identified from the external sources, and yet, since the apparatus can prevent incorrect recording of a signal, the reliability of the performance of the apparatus can significantly be promoted.

Furthermore, it is also possible for the computing system to functionally establish the relationship between the value output by the A/D converter 33 and the value to be delivered to the D/A converter 34 and then computes the value to be delivered to the D/A converter 34 based on the value of output by the A/D converter 33 before eventually delivering it to the D/A converter 34. Concretely, the condition expressed by the equation $Y1 = K2 * SIN(K3 * X1)$ can be satisfied by designating the value of output by the A/D converter 33 as X1 and the value to be delivered to the D/A converter 34 as Y1, respectively. K2 and K3 respectively designate constants. By applying the above process, the computing system can dispense with memory otherwise needed for preparing a table, thus resulting in a cost saving.

Normally, the deviation of the tracking control target position is about 0.1 micron, and thus, an approximate equation $Y1\ K2*K3*X1$ can be applied in order that the deviation can be computed much faster than the computation of a sine wave, thus allowing the apparatus to precisely adjust the tracking control target position in an extremely short period of time.

Needless to say, the tracking control target position can also be adjusted very quickly by tabulating or functionally calculating the needed values even when the division circuit 18 were not provided for in the system.

Figure 3:
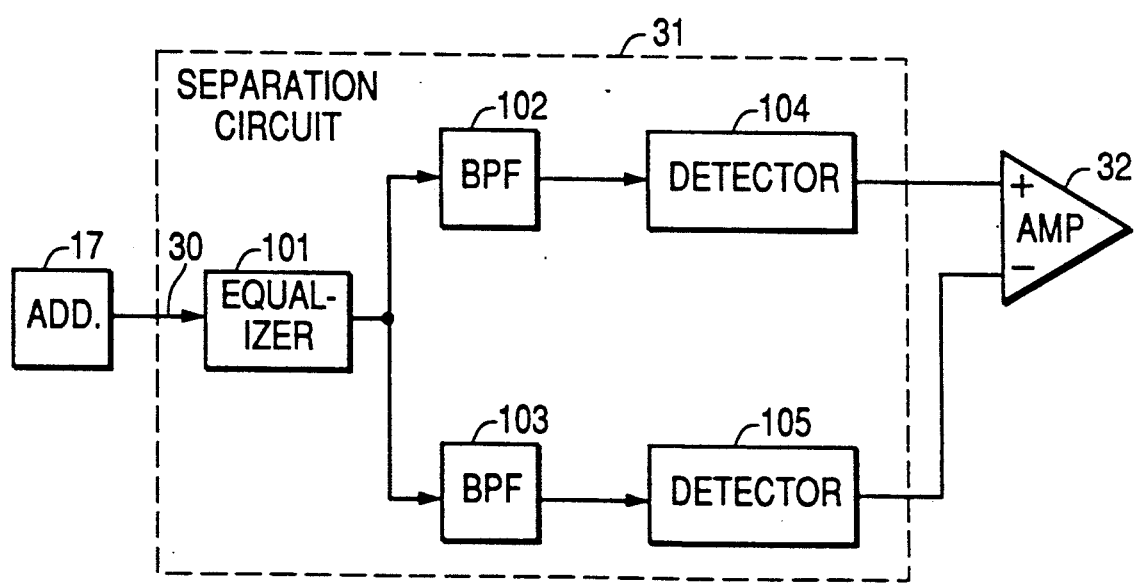
FIG. 3 illustrates a simplified block diagram of the separation circuit 31 shown in FIG. 1.

Next, referring to FIG. 3, the detail of the separation circuit 31 is described below. The separation circuit 31 is composed of equalizer 101, band-pass filters 102 and 103 which respectively filter signals containing single-frequencies f1 and f2, and detector circuits 104 and 105 which respectively detect the envelopes of signals filtered out of the band-pass filters 102 and 103, respectively.

When reproducing a signal on the recording carrier 7, depending on the frequency of the recorded signal, the amplitude of the reproduced signal is variable. The amplitude of the reproduced signal is also variable depending on the frequency characteristics of the current-to-voltage (I/V) converters 14 and 15 or the addition circuit 17. However, the amplitude of the reproduced signal is greatly affected by the space frequency of the signal recorded on the recording carrier 7. In other words, the frequency characteristic of the amplitude of the reproduced signal is largely dependent on the diameter of the light beam 2 and the bit-length of the signal on the recording carrier 7. To compensate for the characteristic of the reproduction signal, equalizer 101 is provided for the separation circuit 31. Since the equalizer 101 compensates for the frequency characteristic of the reproduction signal, when the tracking-control target position is at the correct point, the detector circuits 104 and 105 respectively output signals which are identical to each other. In other words, the tracking-control target position is properly adjusted so that no signal can be output from the differential amplifier 32.

Next, referring to FIG. 4, the detail of the target position adjusting track preliminarily provided for the recording carrier 7 is described below.

Figure 4:
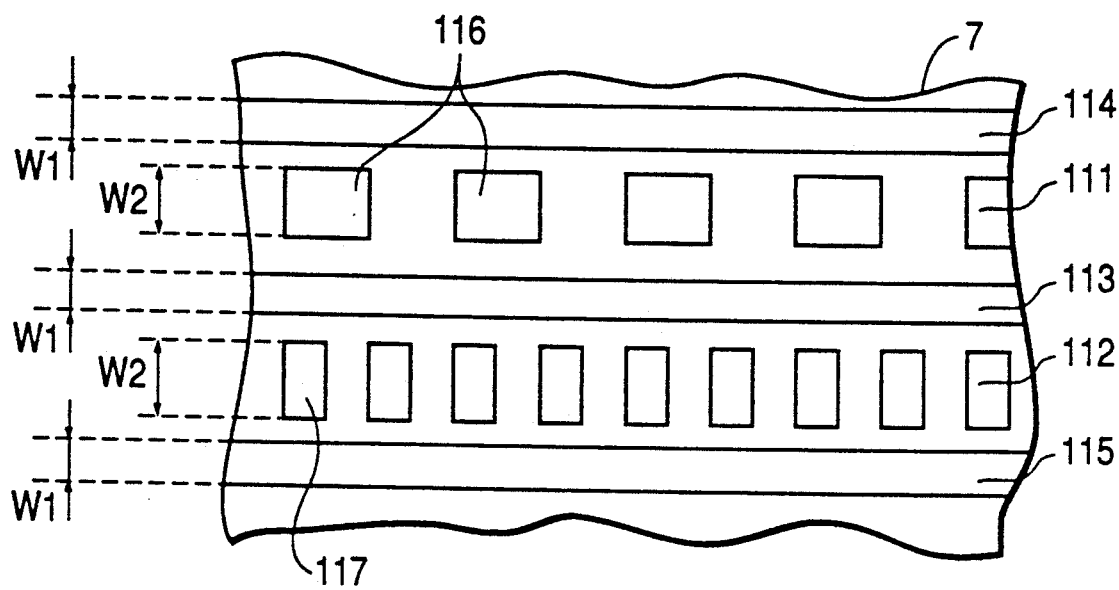
FIGS. 4 and 5 each illustrate an enlarged view of a target-position adjusting track on a recording carrier suited for use with the apparatus shown in FIG. 1.

FIG. 4 exaggeratedly illustrates the partially enlarged plane of the recording carrier 7. Track 111 is composed of bit 116 of the position adjusting signal containing a single frequency f1. Track 112 is composed of bit 117 of the position adjusting signal containing a single frequency f2. The reference numeral 113 designates the position adjusting signal between tracks 111 and 112. The reference numerals 114 and 115 respectively designate normal tracks for recording signals. The reference numeral W1 designates the width of the tracks 113, 114, and 115, whereas W2 designates the width of the tracks 111 and 112. Since the track width is arranged in such that W1<W2, volume of the amplitude of the crosstalk component from tracks 111 and 112 grows while adjusting the tracking-control target position in order that the light beam 2 can correctly be positioned right above the track 113. This in turn improves the signal-to-noise (S/N) ratio of the signal filtered out of the band-pass filters 102 and 103, thus permitting the adjustment system to achieve extremely precise adjustment of the target position of tracks.

The inclined degree of the recording carrier 7 varies locally. As a whole, the recording carrier 7 slightly inclines in the internal circumference and sharply inclines in the external circumference. Accordingly, the reliability of the apparatus can be promoted by initially setting two of the target position adjusting tracks to the unused internal and external circumferences of the recording carrier 7, followed by entry of the mean value of the value adjusted in connection with the internal circumference before delivery to the D/A converter 34 and the other value adjusted in connection with the external circumference before delivery to the D/A converter 34 prior to the execution of either the recording or the reproduction.

The reliability of the apparatus can be promoted furthermore by sequentially executing the following steps: First, the target-position adjusting tracks are provided for a plurality of locations at the predetermined intervals in the radial direction of the recording carrier 7 for example. Next, the adjustment processes mentioned above are performed on all the target-position adjusting tracks and then all the values of the performed adjustment are stored in order to vary the value for delivery to the D/A converter 34 as per the track used for the recording or the reproduction of signals. When executing these processes, it is suggested to preliminarily determine the region of the recording/reproduction track against each target-position adjusting track and then set the value in the D/A converter 34 while seeking the desired track. This saves time needed for setting the value in the D/A converter 34.

If such data were preliminarily recorded on the target-position adjusting track to allow the MPU 26 to identify the presence of the target-position adjusting track, the MPU 26 can correctly identify it even when address signal cannot be read or when it is incorrectly read due to the presence of the dropout of the signal. This in turn simplifies the structure of the system and promotes the reliability of the performance of the apparatus as well.

When reproducing signals recorded on tracks 114 and 115 adjoining tracks 111 and 112 in the presence of the target-position adjusting track shown in FIG. 4, the reproduction signal may adversely be affected by the target-position adjusting signal. To prevent this, it is desired to systematically control the system so that no signal can be recorded on tracks 114 and 115.

Figure 5:
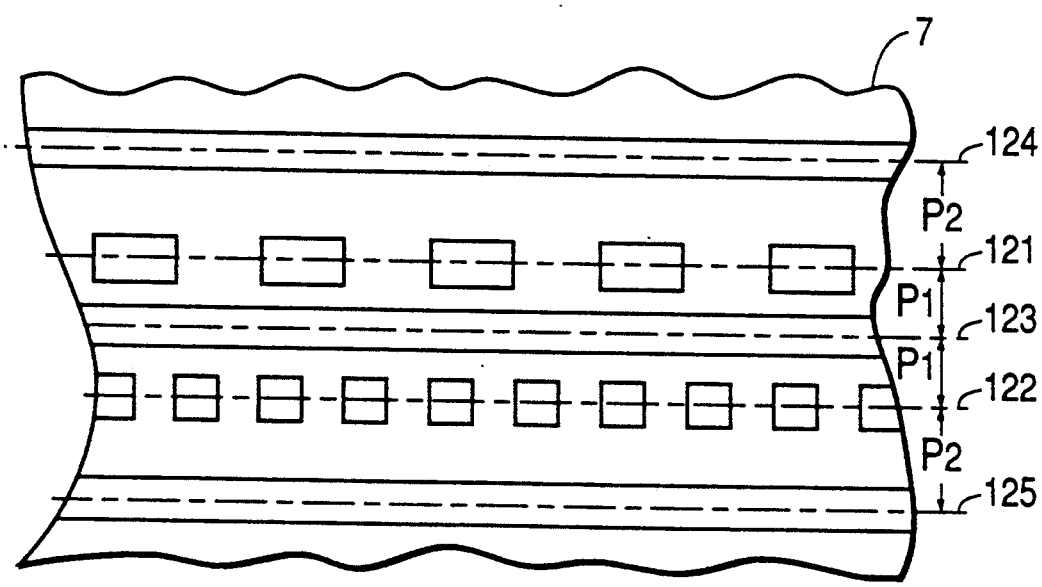

To eliminate the potential defect mentioned above, the target-position adjusting track is arranged as shown in FIG. 5. Like FIG. 4, FIG. 5 exaggeratedly illustrates the partially enlarged plane of the recording carrier 7. The reference numeral 121 designates the center of the track which is composed of the bit of a single-frequency f1, and numeral 122 designates the center of the track which is composed of a bit of single-frequency f2, and numeral 123 designates the center of the target-position adjusting track, respectively. The reference numerals 124 and 125 respectively designate the centers of tracks adjoining those tracks which are respectively composed of the bits of the single-frequencies f1 and f2. The reference numeral P1 designates the distance between the centers 121/123 and the centers 122/123, i. e., the track pitch. The reference numeral P2 designates the distance between the centers 121/124 and the centers 122/125, respectively. Since the track pitch is arranged such that $P1 < P0 < P2$ (where P0 designates the normal track pitch), when the light beam 2 is on the center 124 or 125, there is low amplitude of the crosstalk component in the first and second position adjusting signals. However, when the light beam 2 is on the target-position adjusting track, there is substantial amplitude of the crosstalk component in the first and second position adjusting signals. Accordingly, the data signal can also be recorded on the track adjoining the tracks composed of the bits of the single-frequencies f1 and f2, thus preventing the recording capacity from decreasing. The embodiment of the present invention also allows the formation of the target-position adjusting track preliminarily provided on the recording carrier 7 like the one shown in FIG. 6.

Figure 6:
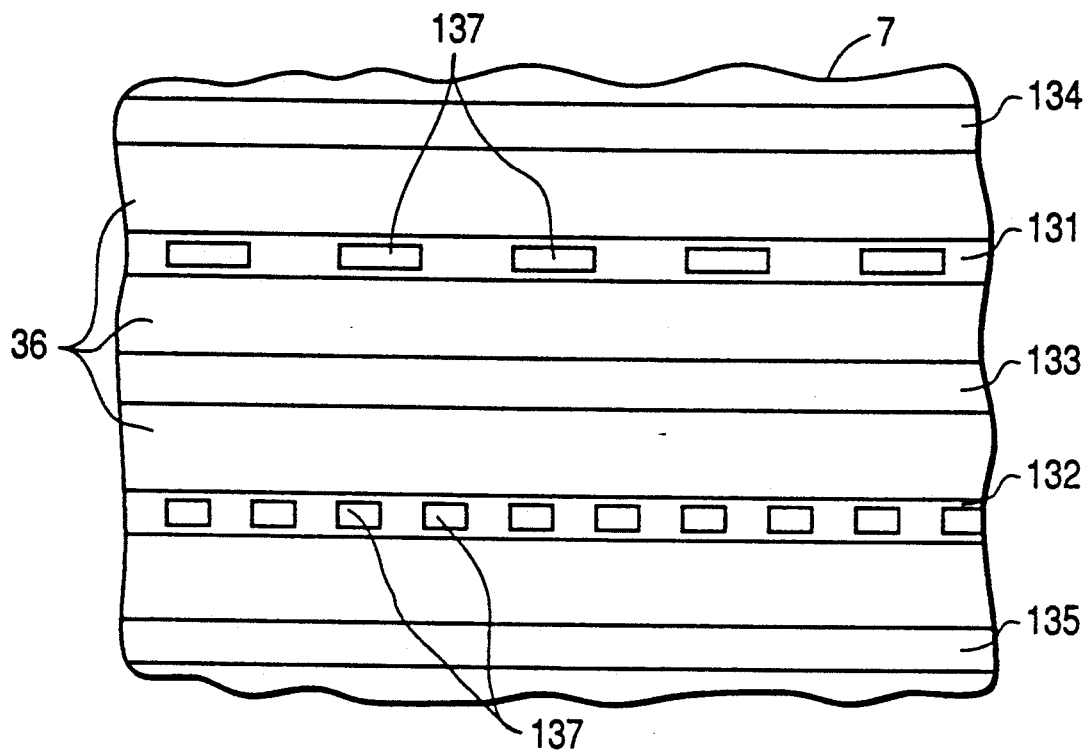
FIG. 6 and 7 respectively illustrate enlarged views of other embodiments of target-position adjusting tracks suited for use with the apparatus shown in FIG. 1.

FIG. 6 exaggeratedly illustrates a partially enlarged plane of the recording carrier 7. The reference numeral 131 designates a single-frequency f1 recorded the track; numeral 132 designates a single-frequency f2 recorded on the track, and numeral 133 designates the target-position adjusting track provided between tracks 131 and 132. The reference numerals 133 and 134 respectively designate the intervals between tracks. The bit 137 formed in tracks 131 and 132 has $\frac{1}{8}$th $\lambda$ ($\lambda$ designates the wavelength of the light beam 2) of the depth, which is identical to the depth of a slit. Concretely, the bottom surface of the intervals 136 of the tracks is flush with the bottom surface of the bit 137. By arranging the structure in this way, the recording carrier 7 can easily be manufactured.

The embodiment also allows provision of one-quarter $\lambda$ of the depth of the bit 137. Owing to this arrangement, the signal-to-noise (S/N) ratio is promoted. The above arrangement allows the system to perform very precise tracking-control target-position adjustment for the tracks.

Figure 7:
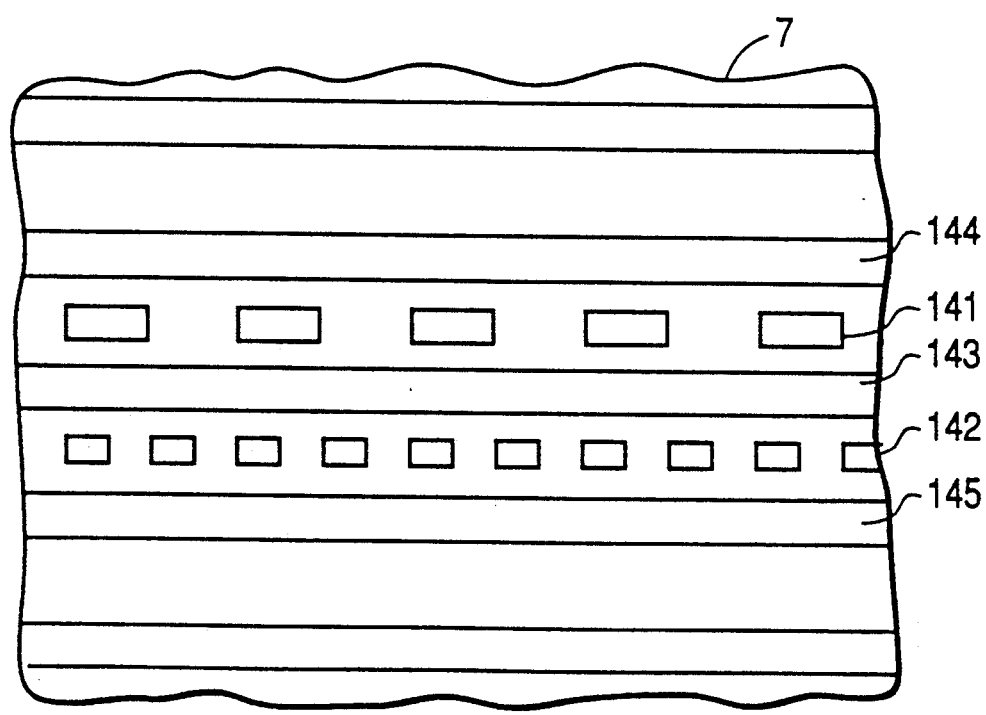

The embodiment also allows formation of the target-position adjusting track on the recording carrier 7 like the one shown in FIG. 7.

FIG. 7 exaggeratedly illustrates a partially enlarged plane of the recording carrier 7. The reference numeral 143 designates the target-position adjusting track provided between tracks 144 and 145. The reference numeral 141 designates the rank of the bits having a single frequency f1 recorded between tracks 143 and 144. The reference numeral 142 designates the rank of the bits having a single frequency f2 recorded between tracks 143 and 145. In the manner mentioned above, the target-position adjusting signals containing single frequencies f1 and f2 may also be recorded between the tracks. When implementing this, in order to prevent the track deviation signal from adversely being affected, it is desired that signals be provided with a form which is identical to that of the signal to be recorded on the recording material layer.

Figure 8:
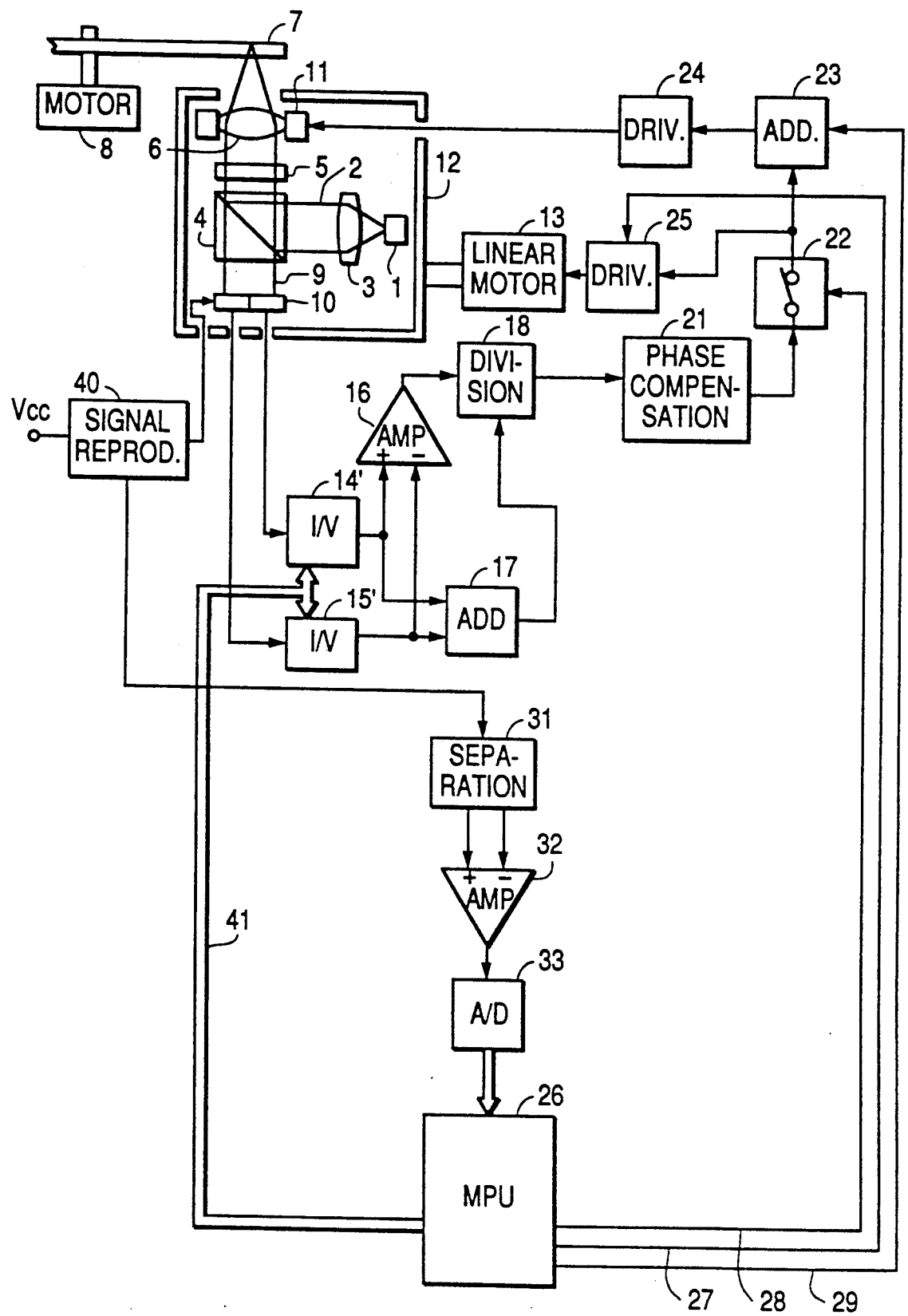
FIG. 8 illustrates a schematic block diagram of an apparatus reflecting another embodiment of the present invention.

FIG. 8 illustrates a schematic block diagram of another embodiment suited for use with optical data recording and reproduction apparatus. A description of those components identical to those shown in FIG. 1 has been omitted. The reference numeral 40 designates the signal reproduction circuit which reproduces a signal recorded on the recording carrier 7 by fully detecting a photocurrent output from the photosensor 10. The photosensor 10 is composed of a PIN photodiode for example, which receives an inversely-biased voltage Vcc via the signal reproduction circuit 40. Based on the variation of the photocurrent, the signal reproduction circuit 40 reproduces the signal recorded on the recording carrier 7. The photocurrent outputs from the photosensor 10 are converted into voltages by the current-to-voltage (I/V) converters 14' and 15', and then the converted voltages are routed to the differential amplifier 16 and the addition circuit 17.

Next, the adjustment of the tracking-control target position is described below. First, a high-pass filter eliminates the low-frequency component (such as components below 10K Hz, for example) from the reproduction signal. Then, the signal reproduction circuit 40 delivers the filtered signal to the separation circuit 31.

When adjusting the target position, the MPU 26 initially detects the target-position adjusting track and activates the tracking control system so that the light beam 2 on the recording carrier 7 can correctly be positioned on the target-position adjusting track. While the light beam 2 is retained on the position-adjusting track of the recording carrier 7, adjustment of the target position is executed by detecting the position-adjusting signal of single frequencies f1 and f2 which are intermingled with each other due to the presence of a crosstalk component.

The separation circuit 31 initially separates signals of single-frequencies f1 and f2 from the signal output from the signal reproduction circuit 40, and then detects the envelope of the signals before transmitting the envelope-detected signals to the differential amplifier 32. The differential amplifier 32 outputs a signal corresponding to the difference between the received signals to be delivered to the A/D converter 33 which converts the analog signal into a digital signal. The A/D converter 33 converts the analog signal from the differential amplifier 32 into a digital signal, which is then delivered to the MPU 26. Based on the value of the output of the A/D converter 33, the MPU 26 detects the direction in which the tracking-control target position deviates, and then, in order to minimize the deviation, the MPU 26 outputs signals to the I/V converters 14' and 15' via line 41.

The circuit gain of the I/V converters 14' and 15' is variable in accordance with the signals from the MPU 26. The MPU 26 multiplies the gain of the I/V converter 14' N1 times and the gain of the other I/V converter 15' 1/N1 times. As a result, in response to the signal from the MPU 26, the tracking-control target position varies.

While checking the signal output from the A/D converter 33 in order that the target position can gradually approach the desired position, the MPU 26 varies the gains of the I/V converters 14' and 15', and finally sets the value of the A/D converter 33 in the predetermined range. In this case, in order that the MPU 26 can easily measure the amount of the deviation of the target position by referring to the value of the output of the A/D converter 33, it is possible for the MPU 26 to preliminarily store the values to be delivered to the I/V converters 14' and 15' in a table versus the value of the A/D converter 33. For example, when setting the gains of the I/V converters 14' and 15', the MPU 26 delivers the values G0 and G0' (which are preliminarily stored in correspondence with the value of the output of the A/D converter 33) to the I/V converte ers 14' and 15'. When the gains of the I/V converters 14' and; 15' respectively vary, in correspondence with this variation, the tracking control target position also varies.

After shifting the tracking-control target position, the MPU 26 again measures the value of the A/D converter 33. If the measured value were out of the predetermined range, the MPU 26 computes the values G1 and G1' (corresponding to the value of the A/D converter 33) to be delivered to the I/V converters 14' and 15'. The MPU 26 then delivers the value (G0+G1) to the I/V converter 14' and the value (G0'+G1') to the I/V converter 15'. The MPU 26 repeats those processes mentioned above until the value of the A/D converter 33 finally enters into the predetermined range. Execution of the above processes allows the MPU 26 to save the rounds of repeating those processes and set the target position vary quickly.

The reliability of the apparatus can be promoted furthermore by sequentially executing the following steps. First, the target-position adjusting tracks are provided for two locations on the normally-unused internal and external circumferences. Then, the MPU 26 computes the values to be set to the I/V converters 14' and 15' when the target position is correctly adjusted on the internal circumference, and simultaneously, the MPU 26 also computes the values to be set to the I/V converters 14' and 15' when the target position is adjusted on the external circumference. Then, the MPU 26 sets the mean value of the above to the I/V converters 14' and 15' before the apparatus eventually executes the recording or the reproduction of signals.

The reliability of the apparatus can be promoted furthermore by sequentially executing the following steps. First, the target-position adjusting tracks are provided for a plurality of locations at the predetermined intervals for example. Next, the MPU 26 adjusts the target positions on all the target-position adjusting tracks and stores the track-adjusted values, and then varies the values to be set to the I/V converter 14' and 15' as per the tracks used for the recording or the reproduction. In this case, if the region of the track used for the recording or reproduction were preliminarily determined against one of the target-position adjusting tracks and then delivered to the I/V converters 14' and 15' while seeking the desired track, the system can save the time needed for data entry.

The gains of the I/V converters 14' and 15' shown in FIG. 8 are subject to variation. However, it is possible for the system to vary either of these gains. Nevertheless, if the gain varies, the frequency characteristic also varies, and thus, if the gain were variable in an extensive range, then, the variable range of individual gain can be narrowed by varying the gains of the I/V converters 14' and 15', thus eventually minimizing the variation of the frequency characteristics.

It is also possible for the system to preliminarily and functionally establish the relationship between the value of the output of the A/D converter 33 and the value to be delivered to the I/V converters 14' and 15' before eventually computing the value to be delivered to the I/V converters 14' and 15' based on the value of the output of the A/D converter 33. This allows the system to dispense with memory otherwise needed for the tabulation of data and eventually reduce costs.

The relationship between the signal V0 output from the differential amplifier 16 and the signals V1 and V2 output from the I/V converters 14' and 15' is expressed by the equation shown below. G2 and G3 respectively designate constants.

$$V0 = G2*V1 - G3*V2 = G2(V1 - G3/G2*V2)$$

It is also possible for the system to adjust the tracking-control target position by varying the value G3/G2, i. e., the differential gain. Instead of varying the gains of the I/V converters 14' and 15', the system may also execute adjustment of the tracking-control target position by shifting the photosensor 10 in the direction perpendicular to the direction of the track on the sensor surface.

Figure 9:
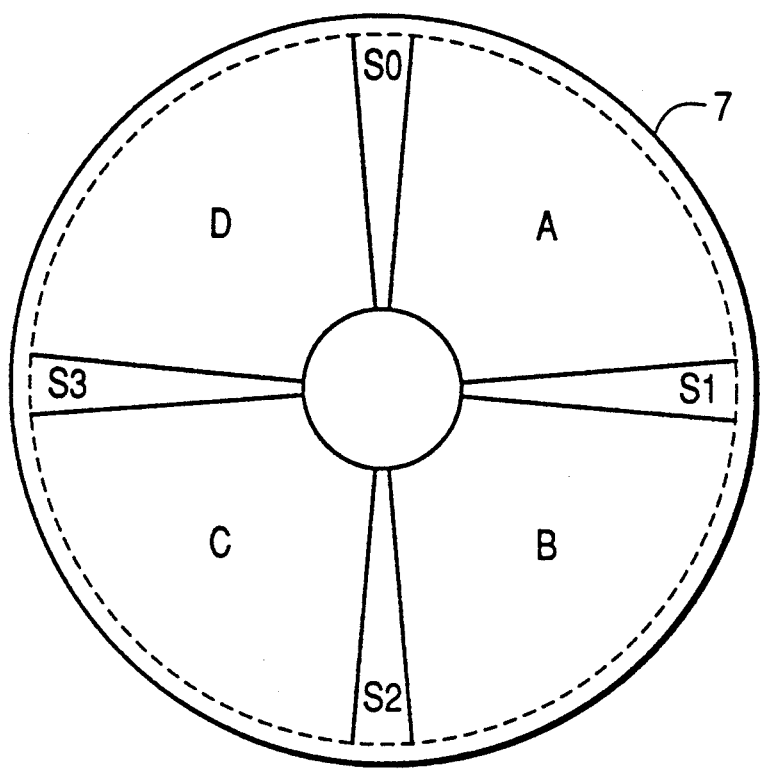
FIG. 9 illustrates a whole view of a second embodiment of a recording carrier according to the present invention.

Referring now to FIG. 9, another embodiment of the target-position adjusting track preliminarily provided on the recording carrier 7 is described below.

FIG. 9 is the overall view of the recording carrier 7. A spiral guide groove (track) is continuously provided on the recording carrier 7 from the external circumference to the internal circumference. The track on the recording carrier 7 is split into a plurality of sectors. The tip of each sector contains the recorded data related to the track number and a sector number in the concave and convex form. FIG. 9 illustrates that the tracks on the recording carrier 7 are divided into four sectors which are composed of the address sectors S0 through S3 and the data-recording areas A through D. For example, data corresponding to the address sector S0 is recorded on the data-recording area A.

The tracking-control target-position adjusting track is provided for the internal and external circumferences (which are normally held unused) of the recording carrier 7.

Next, referring to FIG. 10, a detail of the tracking-control target-position adjusting track is described below. To facilitate the explanation, FIG. 10 linearly illustrates the track. The reference numerals 61A through 61c respectively designate tracks; numerals 62a through 62d designate address data, and numerals 63a through 63d designate the data-recording regions, respectively. Actually, these tracks are spirally composed, and thus, the rear-end of the track 61a and the tip of the track 61b, and the rear-end of the track 61b and the tip of the track 61c, are respectively connected to each other. The reference numeral 61b designates the track which sets the light beam 2 in position when adjusting the tracking-control target position. Adjustment signals each containing the predetermined identical frequency are recorded on the data-recording regions 63b and 63d of the track 61a and also on the data-recording regions 63a and 63c of the track 61c. Those adjustment signals 64 are alternately recorded on the tracks 61a and 61c so that these signals 64 cannot superimpose themselves in the radial direction of the recording carrier 7.

Figure 11:
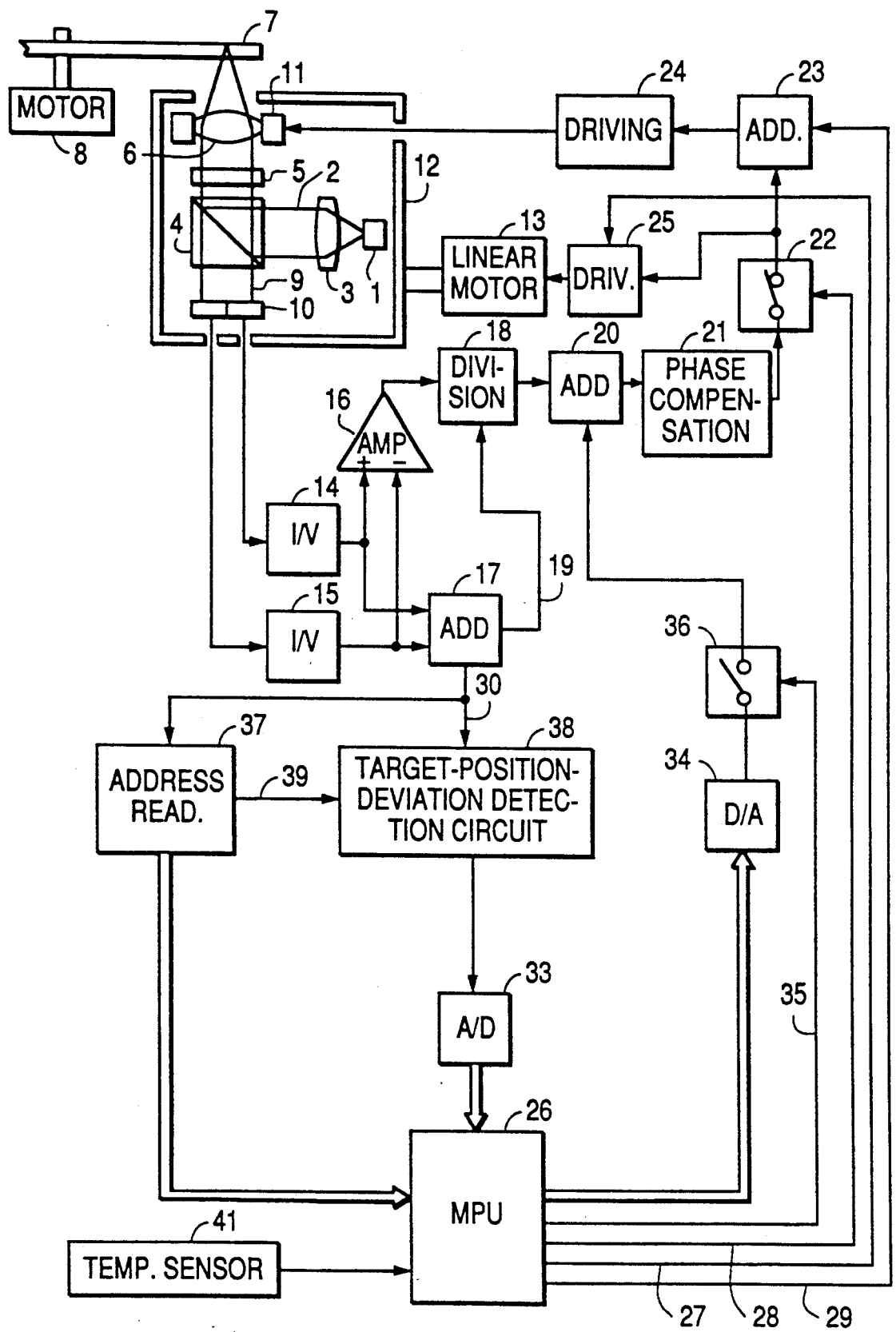
FIG. 11 illustrated a schematic block diagram of another embodiment of an apparatus suited for adjusting the tracking-control target position using the recording carrier shown in FIG. 9.

Next, referring to FIG. 11, details of the tracking-control target-position adjusting apparatus using the recording carrier 7 embodied by the invention are described below. A description of those components identical to those shown in FIG. 1 has been omitted.

Figure 10:
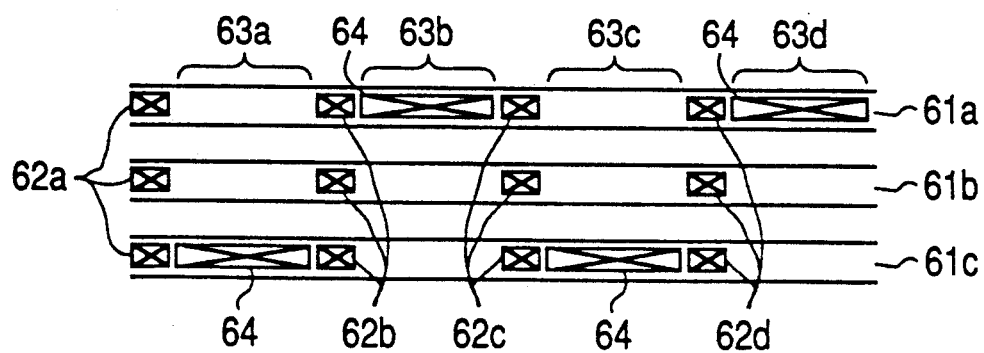
FIG. 10 illustrates an enlarged view of a target-position adjusting track on the recording carrier shown in FIG. 9.

When adjusting the tracking-control target-position, the MPU 26 initially detects the target position adjusting track 61b shown in FIG. 10, and then activates the tracking control system so that the light beam 2 on the recording carrier 7 is correctly positioned on the target-position adjusting track 61b. Since the tracks on the recording carrier 7 are spirally formed, the MPU 26 controls the movement of the light beam 2 by bringing one track backward in each full turn of the recording carrier 7 so that the light beam 2 can constantly remain still on the target-position adjusting track 61b.

While maintaining the condition in which the light beam 2 on the recording carrier 7 is constantly positioned on the track 61b, the MPU 26 adjusts the tracking-control target position by detecting the adjustment signal 64 which intermingled from the tracks 61a and 61c via crosstalk components.

The target-position-deviation detection circuit 38 extracts the adjustment signal 64 from the signal of the addition circuit 17 supplied via line 30 and then detects an envelope waveform. Next, based on the sample-hold signal of the address-reading circuit 37 supplied via line 39, the target-position-deviation detection circuit 38 holds the amplitude of the crosstalk signals from the tracks 61a and 61c shown in FIG. 10, and then delivers the signal corresponding to the amplitude difference to the A/D converter 33. The A/D converter 33 converts the analog signal from the target-position-deviation detection circuit 38 into a digital signal, and then delivers the digitally converted signal to the MPU 26. Based on this digital signal from the A/D converter 33, the MPU 26 detects the direction in which the tracking-control target position deviates. To minimize the deviation, the MPU 26 outputs a signal to the D/A converter 34, and simultaneously shortcircuits the switch 36 via line 35. While checking the signal output from the A/D converter 33 so that the tracking-control target position can gradually approach the desired position, the MPU 26 delivers the gradually incremental signals to the D/A converter 34 before eventually bringing the value of the output of the A/D converter 33 into the predetermined range.

Since the MPU 26 can easily compute the amount of the deviation of the output of the target position based on the value of the A/D converter 33, this embodiment of the invention can utilize the art identical to that of the first embodiment shown in FIG. 1. For example, the rounds of repeating those processes mentioned above can be saved, and yet, the target position can be set in a very short period of time by causing the MPU 26 to preliminarily store the table of values to be delivered to the D/A converter 34 against the value of the output of the A/D converter 33.

The tracking-control target position is also variable due to the variation of temperature of the apparatus itself. The reference numeral 41 designates a thermal sensor which measures the temperature of the apparatus. The MPU 26 detects temperature of the apparatus via the thermal sensor 41 and then properly adjusts the tracking-control target position. If the temperature of the apparatus again rises beyond a predetermined amount, the MPU 26 again adjusts the tracking-control target position. As a result, even if temperature of the apparatus varies while operating the apparatus for a long while, there is no fear of causing the tracking-control target position to significantly vary.

Figure 12:
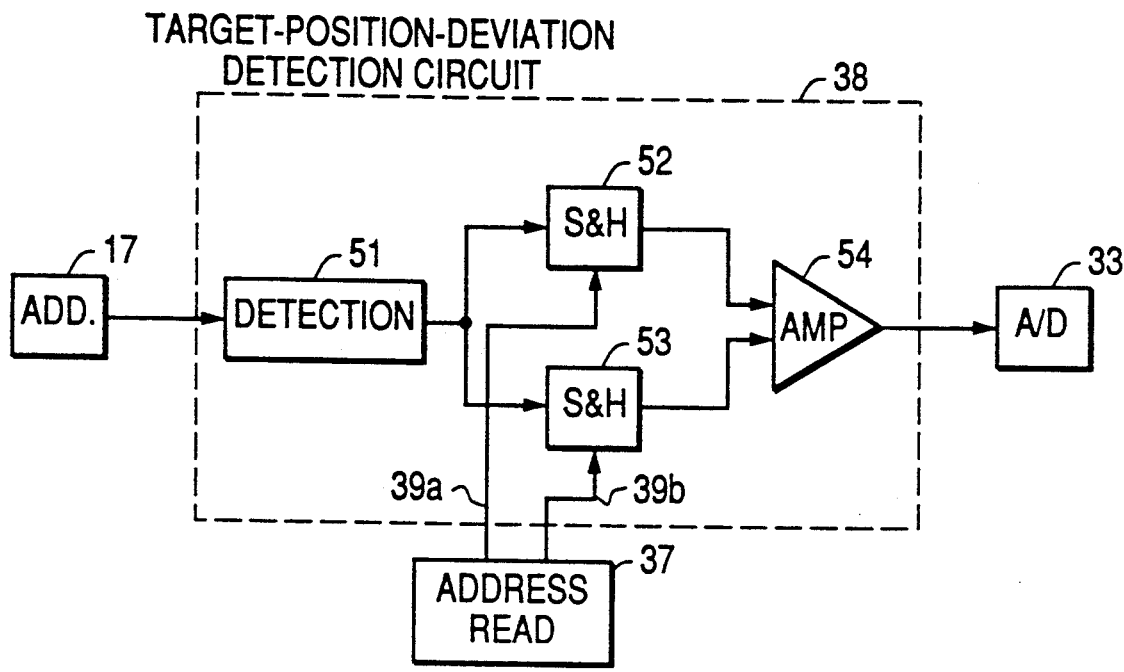
FIG. 12 illustrates a simplified block diagram of the target-position deviation detection circuit shown in Fig. 11.

Referring now to FIG. 12, the structure of the target-position-deviation detection circuit 38 is described below. The target-position-deviation detection circuit 38 is composed of the following: a detector circuit 51 which detects envelope signal output from the addition circuit 17; sample-hold circuits 52 and 53 which respectively hold samples of the input signal voltage and a differential amplifier 54 which outputs a signal corresponding to the difference between signals output from the sample-hold circuits 52 and 53.

Crosstalk components from the position-adjusting signal 64 recorded on the track 61a and crosstalk components from the position-adjusting signal 64 recorded on track 61c shown in FIG. 10 are alternately delivered to the addition circuit 17. The detector circuit 51 detects the envelope of the crosstalk component signals output from the addition circuit 17.

The sample-hold circuit 52 holds a sample of the detected envelope of the crosstalk component signal output from the position-adjusting signal 64 recorded on the track 61a. The sample-hold circuit 53 holds a sample of the detected envelope of the crosstalk component signal output from the position adjusting signal 64 recorded on the track 61a.

The address-reading circuit 37 reads the sector number recorded on the recording carrier 7 and delivers the sample-hold instructing signal to the sample-hold circuit 52 via line 39 when reproducing the sectors 63b and 63d shown in FIG. 10 and detects crosstalk component from the recorded position adjusting signal 64 on the track 61a shown in FIG. 10. The address-reading circuit 37 also delivers the sample-hold instructing signal to the sample-hold circuit 53 via line 39b when reproducing the sectors 63a and 63c shown in FIG. 10 and detects the crosstalk component from the recorded position-adjusting signal 64 on the track 61c. Consequently, the signal corresponding to the difference of those crosstalk-component signals output from the tracks 61a and 61c is delivered to the differential amplifier 54.

Figure 13:
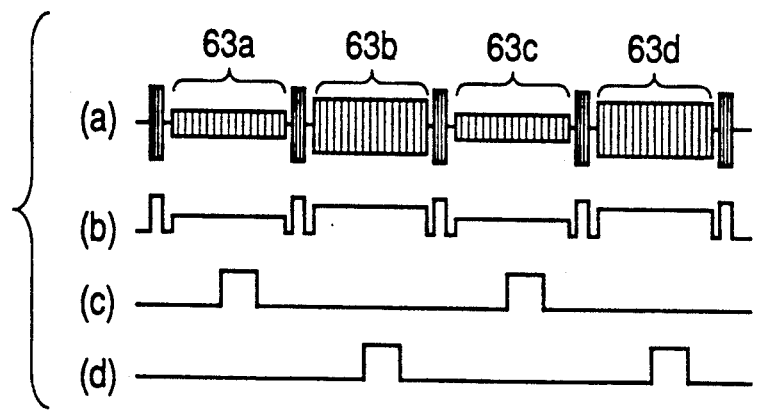
FIG. 13 illustrates a timing chart explaining the operation of the target-position deviation detection circuit 38.

FIG. 13 is the timing chart explaining the operation of the target-position-deviation detection circuit 38 shown in FIG. 12. The waveform (a) designates the signal output from the addition circuit 17; waveform (b) designates the signal output, from the detector circuit 51; waveform (c) designates the sample-hold instructing signal output from the address-reading circuit 37 to the sample-hold circuit 53, and waveform (d) designates the sample-hold instructing signal output from the address-reading circuit 37 to the sample-hold circuit 52, respectively.

According to the embodiment shown in FIG. 10, since the target-position adjusting signals 64 which are alternately being recorded on both sides of the target-position adjusting track 61b contain identical frequencies, there is no need to compensate for the frequency characteristics. As a result, the circuit structure becomes very simple, and yet, the target-position adjustment precision is promoted.

In FIG. 10, the target-position adjusting signals are alternately provided for the tracks 61a and 61b based on the sector unit. The target-position adjusting signals may also alternately be provided for each sector at the predetermined intervals. In this case, based on the address data, the address-reading circuit 37 may alternately output sample-hold instruction signals to the sample hold circuits 52 and 53 at the predetermined intervals.

Needless to say that the target-position adjusting signals 64 are provided between tracks.

The inclined angle of the recording carrier 7 varies locally. However, the reliability of the apparatus can be promoted furthermore by allowing the D/A converter 34 to internally set the mean value of the value to be set to the D/A converter 34 when the target position is adjusted in connection with the internal circumference and the value to be set to the D/A converter 34 when the target position is adjusted in connection with the internal circumference.

It is also possible for the system to provide the mean value at a certain position of the external circumference or the internal circumference of the recording carrier 7.

The reliability of the apparatus can be promoted furthermore by automatically adjusting the target position immediately after turning the power-supply switch of the apparatus ON or immediately after replacing the recording carrier 7. Furthermore, if the tracking-control target position were properly adjusted every predetermined period of time by effectively using the off-period of the apparatus, the system can dispense with the thermal sensor, and yet, the reliability on the performance of the apparatus can be promoted furthermore.

It is also suggested that, while the apparatus remains off, such an arrangement may be made so that the light beam can automatically be positioned on the target-position adjusting track and readjustment be executed if the target position deviates as a result of a varied temperature of the apparatus.

The invention has thus been described. It should be understood however that the scope of the invention is not merely confined to those typical embodiments described above.

For example, those signals 116 and 117 recorded on tracks 11 and 112 shown in FIG. 4 may have the status identical to those of the signals recorded on the recording carrier 7 like the variable-density recording format for example. In this case, it is desired that the recording be implemented by means of the reference apparatus determined after completing the recording carrier so that the identical signals can constantly be recorded on all the available recording carriers.

The above embodiments have respectively introduced the reflection-format optical system. Instead, a beam-permeation optical system may also be introduced. Actually, a wide variety of optical system have been devised. However, the invention is by no means dependent on the type of optical system.

Furthermore, even when the embodiment of the invention is introduced to the optical-disc reproduction system, since the tracking-control target position is correctly adjusted to the predetermined point, the quality of the reproduced signal and the reliability of the optical-disc reproduction system can significantly be promoted.

Needless to say, the embodiment of the invention are also ideally compatible with magneto-optical data recording and reproduction apparatus, capacitance type reproduction apparatus, magnetic, recording and reproduction apparatuses including VCRs, hard-disc apparatuses, and floppy-disc apparatuses, or the like.

Adaption of the invention allows the tracking-control target position to precisely be adjusted to the predetermined position. This provides satisfactory interchangeability between the data recording/reproduction systems. As a result, reliability of the data recording and reproduction art is significantly promoted, thus offering an extremely useful practical effect.

In particular, when automatically adjusting the target position based on the position-adjusting signal preliminarily recorded on the recording carrier, this recording carrier itself becomes the reference so that all the related apparatuses can properly be adjusted, thus eventually offering more stable interchangeability.

What is claimed is:

1. A tracking-control target position adjusting method used in an apparatus for selectively retrieving information recorded on a plurality of information tracks formed on a recording carrier by using a light beam which forms a light spot on the recording carrier, the recording carrier having a target position adjusting track formed between adjoining areas which have respectively recorded therein first and second adjusting signals which are optically detectably when the light spot is on the target position adjusting track, the apparatus being operable in a tracking control mode in which a tracking error signal indicative of a position of the light spot relative to an information track is produced from a reflected light beam reflected from the recording carrier at a position where the light spot is formed, and the position of the light spot is controlled so that the tracking error signal becomes equal to a target position value indicative of a target position where the light spot is to be positioned on the information track, said method including:

a target position adjusting signal producing step which comprises the substeps of:
positioning the light spot on the target position adjusting track while operating the apparatus in the tracking control mode so as to position the light spot on a target position on the target position adjusting track;

detecting the first and second adjusting signals from the reflected light beam; and detecting a difference in amplitude between the detected first and second adjusting signals to obtain a target position adjusting signal indicative of the difference; and a target position adjusting step responsive to said target position adjusting signal producing step for operating the apparatus in the tracking control mode for the light spot positioned on the target position adjusting track while adjusting a relative relationship between the tracking error signal and the target position value based on the target position adjusting signal to thereby adjust the target position to an optimum target position.

2. A method according to claim 1, wherein said target position adjusting step comprises a step of adding the target position value to the tracking error signal to thereby adjust the relative relationship between the tracking error signal and the target position value.

3. A method according to claim 1, wherein the tracking error signal is produced by detecting the reflected light beam from the target track with a pair of optical detecting elements and detecting a difference in amplitude between output signals from the pair of optical detecting elements with a differential amplifier, an output signal of the differential amplifier being used as the tracking error signal, and wherein said target position adjusting step comprises a step of changing a differential gain of the differential amplifier based on the target position adjusting signal to thereby adjust the relative relationship between the tracking error signal and the target position value.

4. A method according to claim 1, wherein the first and second adjusting signals are respectively single frequency signals which are different in frequency from each other.

5. A method according to claim 1, wherein the first and second adjusting signals are respectively single frequency signals which are the same in frequency, and wherein each of the first and second adjusting signals is recorded intermittently so that each recorded portion of first adjusting signal fails to overlap a recorded portion of the second adjusting signal in a width direction of the track.

6. A method according to claim 1, wherein said target position adjusting signal producing step is repeatedly carried out unit the difference in amplitude between the detected first and second adjusting signals is within a predetermined range.

7. A method according to claim 1, wherein said target position adjusting signal producing step is carried out when the recording carrier has been replaced by another recording carrier which has the same function as the replaced recording carrier.

8. A disk-shape recording carrier having formed thereon a plurality of spiral or concentric information tracks on which information are recorded and at least one target position adjusting track which is formed separately from the information tracks and is accompanied at opposite sides thereof with adjoining areas which have respectively recorded therein first and second position adjusting signals; wherein each of the adjoining areas at both sides of the target position adjusting track has a width wider than a width of the target position adjusting track.

9. A disk-shape recording carrier having formed thereon a plurality of spiral or concentric information tracks on which information are recorded and at least one target position adjusting track which is formed separately from the information tracks and is accompanied at opposite sides thereof with adjoining areas which have respectively recorded therein first and second position adjusting signals; wherein a distance P1 between the target position adjusting track and each of the adjoining areas at both sides of the target position adjusting track and a pitch P0 of each of the plurality of information tracks has a relation expressed as $P0 > P1$.

10. A recording carrier according to claim 9, wherein said pitch P0, said distance P1 and the distance P3 between one of the adjoining areas at both sides of the target position adjusting track and a closest one of the plurality of information tracks have a relationship expressed as $P3 > P0 > P1$.

11. A tracking control apparatus for controlling a light spot formed by a light beam on an information recording carrier having formed thereon a plurality of information tracks to be positioned on a target position on an information track, the recording carrier having a target position adjusting track formed between adjoining areas which have respectively recorded therein first and second adjusting signals which are optically detectable when the light spot is on the target position adjusting track, said apparatus comprising:

an optical means for impinging the light beam upon the recording carrier to form the light spot;

a transfer means for transferring at least one of the optical means and the recording carrier so as to move the light spot to a desired position on the recording carrier;

an optical detecting means for detecting a reflected light beam from a portion on the recording carrier where the light spot is formed and for providing an output signal corresponding thereto;

a track deviation detection means coupled to said optical detecting means for detecting from said output signal of the optical detecting means a tracking error signal indicative of a position of the light spot relative to the target position;

a tracking control means responsive to the tracking error signal for controlling the position of the light spot so that the tracking error signal becomes equal to a target position value indicative of the target position;

an adjusting signal detecting means coupled to said optical detecting means, said adjusting signal detecting means being operable when the light spot is controlled by the tracking control means to be positioned on a target position on the target position adjusting track for detecting the first and second adjusting signals from said output signal of said optical detecting means;

a difference detecting means coupled to said adjusting signal detecting means for detecting a difference in amplitude between the first and second adjusting signals detected by the adjusting signal detecting means and for producing a target position adjusting signal indicative of the detected difference; and a target position adjusting means coupled to said track deviation detecting means and said difference detecting means, said target position adjusting means being operable when the light spot is controlled by the tracking control means to be positioned on said target position adjusting track for adjusting a relative relationship between the tracking error signal and the target position value based on the target position adjusting signal to thereby adjust the target position to an optimum target position.

12. A tracking control apparatus according to claim 11, wherein said target position adjusting means comprises an adding means for adding the target position adjusting signal to the tracking error signal.

13. A tracking control apparatus according to claim 11, wherein said optical detecting means comprises first and second optical detecting elements each for detecting the reflected light beam, and said track deviation detection means comprises a differential amplifier for detecting a difference between output signals of the first and second optical detecting elements to obtain the tracking error signal, and wherein said target position adjusting means comprises a means for varying a differential gain of the differential amplifier based on the target position adjusting signal.

14. A tracking control apparatus according to claim 11, wherein said tracking control means includes a photovolume detection means for detecting a volume of the reflected light beam from the output signal of the optical detecting means, and a dividing means for dividing the tracking error signal according to an output signal of the photovolume detection means, and wherein said target position adjusting means comprises a means for adding the target position adjusting signal to an output signal of the dividing means.

15. A tracking control apparatus according to claim 11, wherein the first and second adjusting signals are respectively single frequency signals which are different in frequency from each other, and wherein said adjusting signal detecting means includes a means for compensating for a frequency characteristic of each of the detected first and second adjusting signals.

16. A tracking control apparatus according to claim 11, wherein the first and second adjusting signals are respectively single frequency signals which are the same in frequency, and wherein each of the first and second adjusting signals is recorded intermittently so that each recorded portion of first adjusting signal fails to overlap a recorded portion of the second adjusting signal in a width direction of the track.

* * * * *